(12) United States Patent
Vertenoeuil et al.

(10) Patent No.: US 11,124,309 B2
(45) Date of Patent: Sep. 21, 2021

(54) SINGLE LEVER CONTROL SYSTEM FOR ENGINES WITH MULTIPLE CONTROL MODES

(71) Applicant: General Electric Company, Schenectady, NY (US)

(72) Inventors: Philippe JeanBaptist Vertenoeuil, Prague (CZ); Michele D'Ercole, Prague (CZ); Vojtech Jirasek, Prague (CZ); Milan Matejka, Prague (CZ)

(73) Assignee: General Electric Company, Schenectady, NY (US)

( * ) Notice: Subject to any disclaimer, the term of this patent is extended or adjusted under 35 U.S.C. 154(b) by 810 days.

(21) Appl. No.: 15/865,316

(22) Filed: Jan. 9, 2018

(65) Prior Publication Data

US 2019/0210736 A1    Jul. 11, 2019

(51) Int. Cl.
*B64D 31/04* (2006.01)
*B64D 31/14* (2006.01)
(Continued)

(52) U.S. Cl.
CPC ............ *B64D 31/04* (2013.01); *B64D 31/14* (2013.01); *F02C 9/285* (2013.01); *F02C 9/26* (2013.01); *F05D 2270/46* (2013.01); *F05D 2270/52* (2013.01); *F05D 2270/58* (2013.01); *F05D 2270/60* (2013.01); *F05D 2270/62* (2013.01); *F05D 2270/66* (2013.01)

(58) Field of Classification Search
CPC ......... B64D 31/04; B64D 31/14; F02C 9/285; F02C 9/26; F05D 2270/60; F05D 2270/46; F05D 2270/58; F05D 2270/66; F05D 2270/62
See application file for complete search history.

(56) References Cited

U.S. PATENT DOCUMENTS 1,770,423 A    7/1930  Oehlke
4,012,015 A *  3/1977  Nelson ................... B64D 31/04
                                                244/220
(Continued)

FOREIGN PATENT DOCUMENTS

FR    782072 A    5/1935
GB    501622 A    3/1939

OTHER PUBLICATIONS

Extended European Search Report Corresponding to Application No. 18214616.7 dated Apr. 12, 2019.

*Primary Examiner* — Philip J Bonzell
(74) *Attorney, Agent, or Firm* — Dority & Manning, P.A.

(57) ABSTRACT

An engine control system includes a first user control lever configured for rotational movement between a first control position and a second control position and a second user control lever configured for rotational movement between a third control position and a fourth control position. The first user control lever is configured for operational control of an engine in a first control mode and the second user control lever is configured for operational control of the engine in a second control mode, such as a backup mode. A mechanical link couples the first user control lever to the second user control lever with at least one angular offset. As a result of the angular offset, the second user control lever can be maintained in a safe operating position relative to the first user control lever position.

19 Claims, 8 Drawing Sheets

(51) Int. Cl.
*F02C 9/28* (2006.01)
*F02C 9/26* (2006.01)

(56) References Cited

U.S. PATENT DOCUMENTS

| | | | |
|---|---|---|---|
| 5,149,023 | A | 9/1992 | Sakurai et al. |
| 5,427,336 | A | 6/1995 | Haggerty et al. |
| 5,456,428 | A | 10/1995 | Hegg |
| 5,782,436 | A | 7/1998 | Pohling |
| 6,000,662 | A | 12/1999 | Todeschi et al. |
| 6,572,055 | B1 | 6/2003 | Bernard |
| 7,546,976 | B2 | 6/2009 | Li |
| 7,921,729 | B2 | 4/2011 | Conner et al. |
| 9,422,061 | B2 | 8/2016 | Munier et al. |
| 9,725,182 | B2* | 8/2017 | Elabellaoui ............ B64D 31/04 |
| 10,370,112 | B2 | 8/2019 | Faugeras |
| 2014/0061389 | A1* | 3/2014 | Elabellaoui ............ B64D 31/04 244/224 |
| 2017/0015432 | A1 | 1/2017 | Ferreira et al. |
| 2017/0081038 | A1 | 3/2017 | Looper et al. |

\* cited by examiner

SINGLE LEVER CONTROL SYSTEM FOR ENGINES WITH MULTIPLE CONTROL MODES

FIELD

The present disclosure relates generally to engines for aerial vehicles.

BACKGROUND

An aerial vehicle can rely on one or more engines such as jet turbine engines, turbofan engines, and turbojet engines to control the aerial vehicle. An engine control system is provided that allows the pilot to control the amount of power and/or thrust generated by the engine. Turboprop engines, for example, may include a propeller control lever that receives pilot input to control the propeller speed of the engine, and a power control level that receives user input to control the amount of power generated by the engine. In many situations, a backup or secondary lever is provided that allows the pilot to control the engine in the event of a failure of a primary control mechanism.

BRIEF DESCRIPTION

Aspects and advantages of the disclosed technology will be set forth in part in the following description, or may be obvious from the description, or may be learned through practice of the disclosure.

According to example aspects of the disclosed technology, there is provided a turbine engine control system, comprising a first control lever configured for rotational movement between a first control position and a second control position. The first control lever is configured for operational control of an engine in a first control mode. The control system further comprises a second control lever configured for rotational movement between a third control position and a fourth control position. The second control lever is configured for operational control of the engine in a second control mode. The control system further comprises a mechanical link coupling the first control lever to the second control lever with at least one angular offset, such that for at least a subset of control positions of the first control lever, a distance between the first control lever and the first control position is greater than a distance between the second control lever and the third control position.

According to example aspects of the disclosed technology, there is provided an aerial vehicle, comprising one or more turbine engines, a first engine control subsystem for the one or more turbine engines, a second engine control subsystem for the one or more turbine engines, a first control lever having a first position corresponding to a minimum power setting of the first engine control subsystem and a second position corresponding to a maximum power setting of the first engine control subsystem, a second control lever having a third position corresponding to a minimum power setting of the second engine control subsystem and a fourth position corresponding to a maximum power setting of the second engine control subsystem, and a mechanical link coupled to the first control lever and the second control lever. The mechanical link provides an offset between the first control lever and the second control lever such that for at least a subset of control positions of the first control lever, a resulting power setting of the second engine control subsystem is less than a resulting power setting of the first engine control subsystem.

According to example aspects of the disclosed technology, there is provided an engine control system, comprising a first control lever coupled to an electronic engine control subsystem for one or more turbine engines. The electronic engine control subsystem is configured to regulate fuel flow to the one or more turbine engines. The engine control system further comprises a second control lever coupled to a backup engine control subsystem for the one or more turbine engines. The backup engine control subsystem is configured to regulate fuel flow to the one or more turbine engines in the event of a failure of the electronic engine control subsystem. The engine control subsystem further comprises a coupling device configured to selectively couple the first control lever to the second control lever with at least one angular offset. The coupling device includes a support member having a fixed connection to the second control lever. The coupling device includes a selective coupling mechanism having a fixed connection to the first control lever and a selective connection to the support member.

These and other features, aspects and advantages of the disclosed technology will become better understood with reference to the following description and appended claims. The accompanying drawings, which are incorporated in and constitute a part of this specification, illustrate embodiments of the disclosed technology and, together with the description, serve to explain the principles of the disclosed technology.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
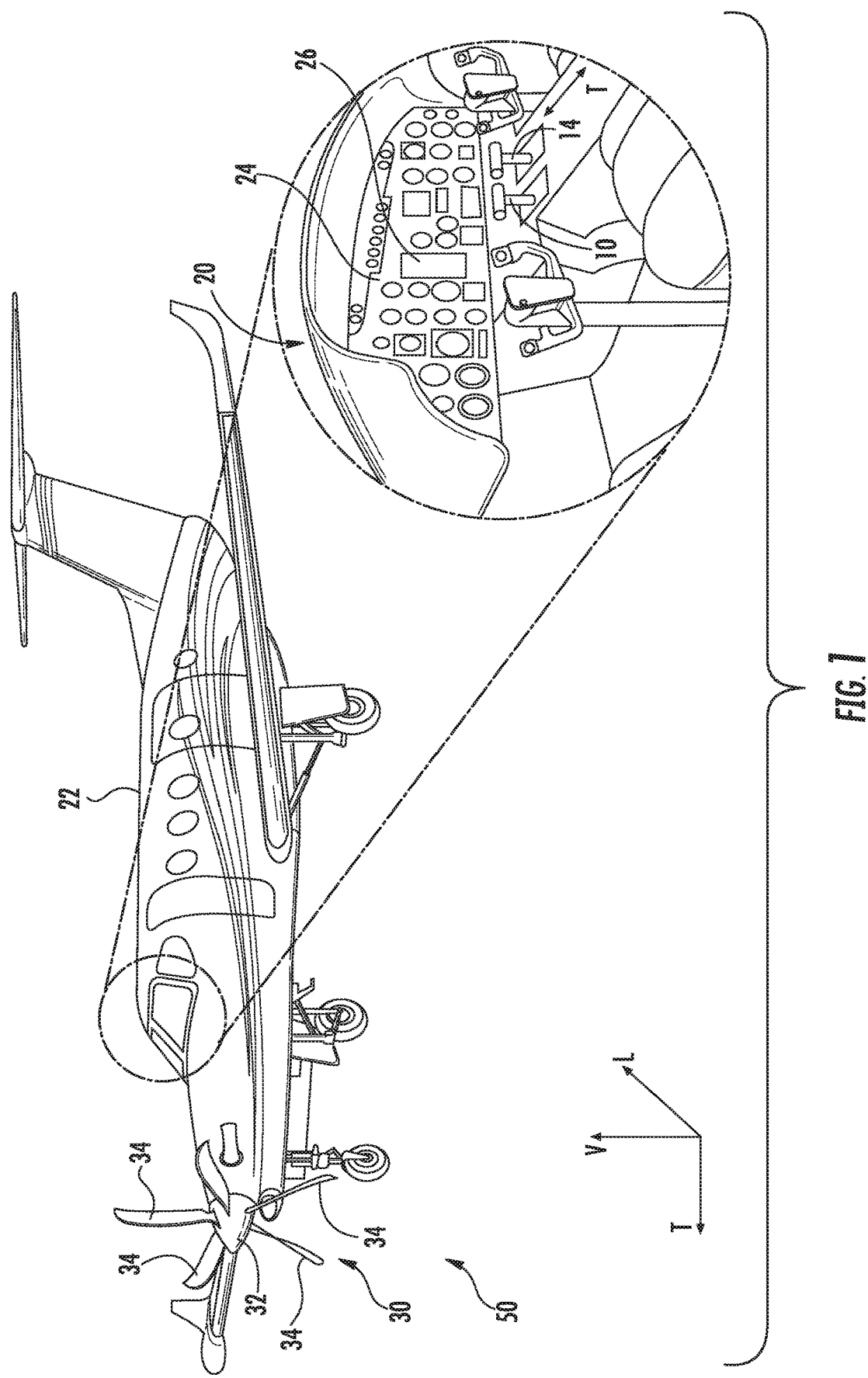
FIG. 1 depicts an example of an aerial vehicle in which embodiments of the disclosed technology may be practiced.

Reference now will be made in detail to embodiments of the disclosure, one or more examples of which are illustrated in the drawings. Each example is provided by way of explanation, not limitation of the disclosed embodiments. In fact, it will be apparent to those skilled in the art that various modifications and variations can be made in the present disclosure without departing from the scope or spirit of the claims. For instance, features illustrated or described as part of example embodiments can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to control systems for aerial vehicles, and more particularly, to control systems for engines of aerial vehicles. According to example embodiments, an engine control system is provided that enables single-lever control of engines having dual control modes. The engine control system enables simultaneous input for control subsystems corresponding to multiple control modes of the engine. More particularly, in some implementations, the engine control system provides two independent control levers for operation of the engine in each of two engine control modes. Additionally, a mechanical link is provided between the two independent control levers that enables single-lever control of the engine in both engine control modes. For example, the mechanical link can transfer input received on a first control lever for the control subsystem of one engine control mode to input for a second control lever for the control subsystem of another engine control mode.

Many engine control systems include a primary control lever that controls a primary control subsystem of the engine in a first control mode, and a backup or secondary control lever that controls a backup control subsystem of the engine in a second control mode. For instance, some engine control systems provide a first, primary control lever for a pilot to control the engine (e.g., fuel flow) using a controller such as an electronic control unit (ECU) or electronic engine controller (EEC), and a second, backup control lever for the pilot to control the engine using a hydromechanical subsystem in the event of failure of the EEC. In order to avoid large changes in engine operating conditions when the engine switches between control modes in such systems, a pilot may decide to place the backup control lever in a similar position to the main control lever. For example, the pilot may decide to pre-position the backup lever to a similar position as the main lever at or after each significant flight change.

The workload for a pilot using these types of systems may prove burdensome. Some aircraft applications result in frequent or numerous flight condition changes. As such, a pilot may have to frequently pre-position the backup lever to the new position of the main lever. This situation may not be optimal, particularly in the situation of quick and numerous flight condition changes as may be experienced in applications such as aerobatics, crop-dusting, combat, etc. Indeed, some applications may not provide sufficient time for the pilot to pre-position the backup lever.

According to example aspects of the disclosed technology, an engine control system is provided that provides single-lever control for engines having dual control modes. A mechanical link couples a first control lever for a first control subsystem to a second control lever for a second control subsystem. The first control subsystem may be a main control subsystem and the second control subsystem may be a backup control subsystem. The mechanical link causes actuation of the second control lever in response to actuation of the first control lever. In this manner, the backup, second lever can be automatically pre-positioned based on pilot input to the first lever.

According to some embodiments of the disclosed technology, the mechanical link can be coupled to the first control lever and the second control lever. In example embodiments, the mechanical link can be selectively coupled to at least one of the first control lever and the second control lever. More particularly, in some implementations, the mechanical link includes a fixed connection to one control lever and a selective connection to another control lever. For example, the mechanical link includes a mechanical member and a clutch in one example. The mechanical member has a fixed connection to the second control lever for the backup control subsystem. The clutch has a fixed connection to the first lever for the main control subsystem. The mechanical member can be selectively coupled to the clutch, thereby providing a selective connection between the mechanical link and the first lever. For example, the clutch can be configured to receive a portion of the mechanical member. A pin or other fastening mechanism can be used to provide a rigid connection between the clutch and the mechanical member. In this manner, the mechanical link has a first setting whereby the first and second levers are coupled together for movement of both levers in response to input to either lever. Additionally, the mechanical link has a second setting whereby the first and second levers are not coupled together such that the levers may be operated independently. In another example, the clutch can be connected to the second control lever and the mechanical member connected to the first control lever.

According to some embodiments of the disclosed technology, the mechanical link provides an angular offset between the first control lever and the second control lever. In this manner, the mechanical link forces the second lever to a predetermined position relative to the position of the first lever. More particularly, in some implementations, the mechanical link is configured such that for a given position of the first control lever, the second control lever has a position that results in lower fuel flow than the first control lever in the given position. Such an arrangement may be useful in ensuring that the engine is not placed into an unsafe operating condition. This may enable the engine to operate safely in a transition from the main control mode to the backup control mode during conditions ranging from takeoff to cruise. The angular offset can be selected to ensure that a minimum and maximum acceptable loss of power when transitioning between modes is met.

According to some embodiments, the angular offset between the first control lever and the second control lever is fixed. For example, the angular offset between the levers can be the same for all or a subset of the potential actuation positions of the first control lever. In such embodiments, a simple mechanical link can be provided that does not include kinematics. The mechanical link can be configured with few and/or small clearances to provide high accuracy in the angular offset between the control levers.

According to some embodiments, the angular offset between the first control lever and the second control lever can be variable. For example, a kinematics unit can be incorporated within the mechanical link such that the angular offset changes for different positions of the first control lever. More particularly, in some implementations, the angular offset may be smaller at lower power settings and larger at higher power settings. Other examples may be used as may be suitable to the needs of a particular implementation.

Embodiments in accordance with the disclosed technology may provide a number of technical effects and benefits.

As one example, the techniques described herein enable an aerial vehicle that includes multiple control levers for controlling one or more engines to be operated in a similar manner to traditional single lever aircraft controls. The mechanical link provided between multiple levers enables either lever to be used to operate the various control subsystems associated with each lever. Such embodiments, for example, can alleviate the burden on pilots to position a backup control lever independently of a main control lever. The mechanical link may provide safety benefits by ensuring that a backup lever is positioned in a safe position relative to a position of a main control lever.

Additionally, the use of a mechanical link can enable single lever control of different types of engine control subsystems. For example, the mechanical link can enable single lever control of a primary electronic control subsystem, and a backup hydromechanical control subsystem. A hydromechanical backup system may have a simpler backup design and operation, as well as be more cost-effective when compared with redundant electronic control systems. By providing a mechanical link, single lever control of the disparate subsystems can be provided.

According to some embodiments, a mechanical link can be provided for existing aircraft having pre-existing control lever configurations. For example, the disclosed mechanical link may be useful for business and general aviation aircraft. Embodiments may be useful for existing aircraft, where the development of a new lever to connect to multiple control systems downstream may be problematic. Such solutions may prove costly, complex, as well as impact the vehicle design and pilot habits. By contrast, the disclosed mechanical link may provide a simple solution that does not require modification of existing control systems or pilot habits.

In some implementations, the offset provided between control levers is configured based on a characterization of the engine so that the backup lever is not set to an unsafe position relative to a main lever which may control an electronic control subsystem. Electronic control subsystems may receive commands from the main control lever. The electronic control subsystem can process the command and based on measured or predetermined parameters such as altitude (air pressure), outside air temperature, the current state of the engine, and/or engine operating limits, etc. to determine an appropriate fuel flow or other engine control action. The offset between control levers can be based on flight envelopes (e.g., mix/max altitudes, min/max OAT, etc.) in some implementations. The offset can, in some examples, ensure that the backup lever position induced by the mechanical link will not result in an unsafe operating condition for the engine (e.g., too much or too little power).

FIG. 1 depicts a perspective view of an example aerial vehicle 50 according to example embodiments of the present disclosure. The aerial vehicle 50 defines an orthogonal coordinate system, including three orthogonal coordinate axes. In particular, the three orthogonal coordinate axes include a lateral axis L, a longitudinal axis T, and a vertical axis V. In operation, the aerial vehicle 50 can move along at least one of the lateral axis L, the longitudinal axis T, and the vertical axis V.

In the example embodiment of FIG. 1, the aerial vehicle 50 includes an airframe 22 defining a cockpit 20. The cockpit 20 includes an instrument control panel 24 having a display 26. The aerial vehicle 50 further includes a propeller 30 comprising a hub 32 and a plurality of blades 34 extending outwardly from the hub 32. Additionally, the aerial vehicle 50 includes a gas turbine engine (e.g., gas turboprop engine 202 in FIG. 3). The gas turbine engine generates and transmits power to drive rotation of the propeller 30. In particular, rotation of the propeller 30 generates thrust for the aerial vehicle 50.

The aerial vehicle 50 includes an engine control system that includes a first control lever 10 for a first engine control subsystem and a second control lever 14 for a second engine control subsystem. By way of example, the first engine control subsystem can be an electronic engine control subsystem and the second engine control subsystem can be a backup engine control subsystem such as a hydromechanical backup engine control subsystem. An electronic engine control subsystem may include an electronic engine controller (EEC), an electronic control unit (ECU), and/or a Full Authority Digital Engine Control (FADEC) system.

Various linkages may be used between the levers and an engine, including any suitable mechanical and/or electrical connections between the levers and engine or engine controller(s). For example, a first linkage may include one or more wired or wireless electrical connections between first control lever 10 and an EEC for the engine. A second linkage may include one or more mechanical connections between second control lever 14 and the engine.

In example embodiments, the first control lever 10 and second control lever 14 are user control levers such as throttle input devices that are moveable in the direction of the longitudinal axis T. Each lever can be movable between two terminal positions (e.g., minimum and maximum). Accordingly, moving the first and second throttle control levers 10, 14 to or towards the maximum position along the longitudinal axis T increases the maximum engine power of the engine and thrust of the aerial vehicle 50 in a first direction along the longitudinal axis T. In contrast, moving the first and second control levers 10, 14 to or towards the minimum position along the longitudinal axis T decreases the maximum engine power of the gas turbine engine. Typically, moving the first and second control levers 10, 14 includes rotational movement of the controllers although this is not required. For example, moving the first control lever in the direction of the longitudinal axis T towards the nose or tail of the aircraft may cause rotational movement of the control lever and thus, additional movement in a direction along a second axis that is orthogonal to the direction of the longitudinal axis.

It should be noted, however, that the first and second control levers 10, 14 may be any suitable device configured to adjust the maximum engine power of the gas turbine engine. For example, the first and second control levers 10, 14 may each be a switch having at least two discrete positions (e.g., OFF, IDLE, and FLY).

The numbers, locations, and/or orientations of the components of example aerial vehicle 50 are for purposes of illustration and discussion and are not intended to be limiting. Those of ordinary skill in the art, using the disclosures provided herein, shall understand that the numbers, locations, and/or orientations of the components of the aerial vehicle 50 can be adjusted without deviating from the scope of the present disclosure.

Figure 2:
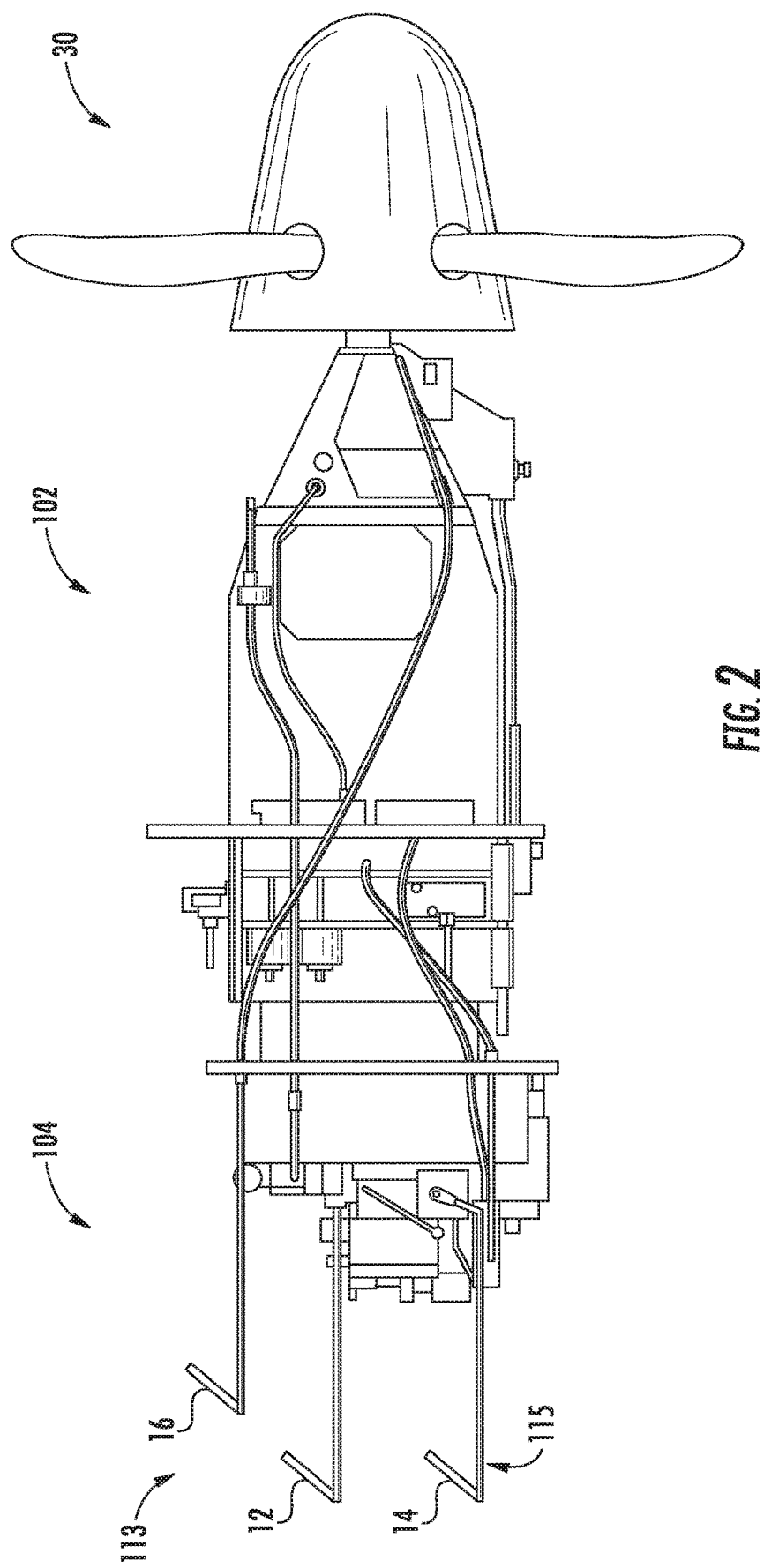
FIG. 2 is a block diagram of an example of a turbine engine including an engine control system.

Traditionally, the engine control systems for many types of aircraft have been purely hydromechanical. By way of example, many single engine turboprop applications utilize hydromechanical control systems with multiple control levers that enable a pilot to control the subsystems of the engine. FIG. 2 depicts a block diagram of an example gas turboprop engine 102 having an engine control system 104. Gas turboprop engine 102 includes a propeller 30 and engine section including an intake, compressor, combustor, turbine, and exhaust. Engine control system 104 includes a first engine control subsystem 113 including fuel control lever 12 and propeller control lever 16. Fuel control lever 12 enables the pilot to directly control the fuel flow injected in the combustion chamber. The propeller control lever 16 enables the pilot to directly control the propeller speed. In many cases, a pilot must also ensure that the inputs to the various levers will not place the engine beyond operating limits. In some example, the first engine control subsystem 113 is a main engine control subsystem.

Engine control system 104 additionally includes a second engine control subsystem 115. In some examples, the second engine control subsystem is a backup engine control subsystem. The second engine control subsystem 115 includes a second control lever 14 that can operate as a backup lever. In many cases, such as single engine applications, an engine control system may include one or more backup control subsystems. The second control lever 14 can operate a backup engine control subsystem comprising a backup fuel flow control subsystem. For example, the second control lever 14 can be a backup lever for operating a shut-off valve that can regulate fuel flow to the gas turboprop engine 102 in the event of a failure of the first engine control subsystem controlled by fuel control lever 12.

Figure 3:
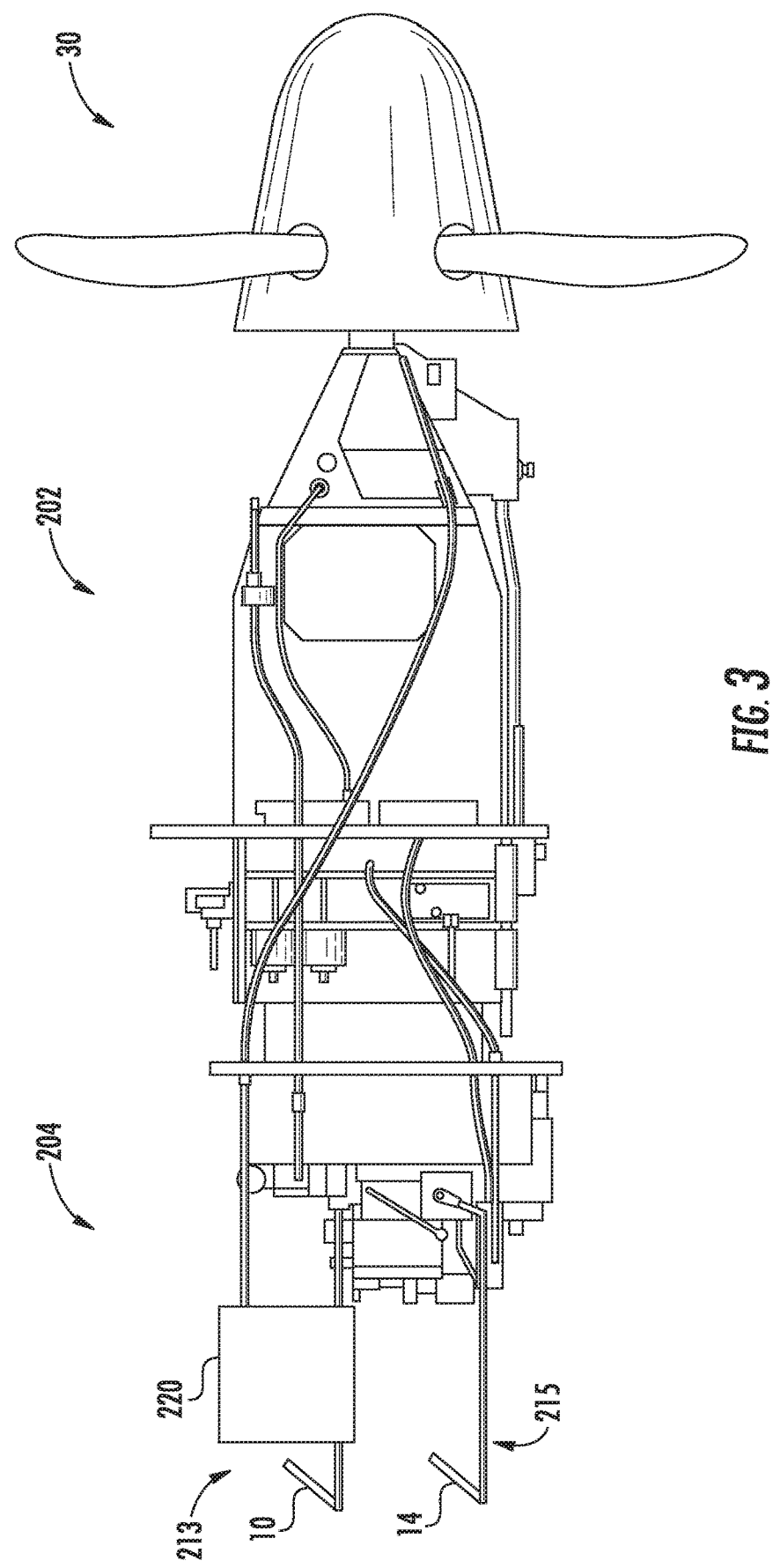
FIG. 3 is a block diagram of an example of a turbine engine including an engine control system.

Some engines, including some turboprop engines, can be controlled by an EEC, FADEC, and/or ECU. FIG. 3 depicts a block diagram of an example gas turboprop engine 202 having an engine control system 204. The engine control system 204 includes first engine control subsystem 213 and second engine control subsystem 215. The first engine control subsystem 213 can be an electronic engine control subsystem including a controller 220. Controller 220 may be an EEC, ECU, FADEC or various combinations of these devices. The first engine control subsystem 213 includes a first control lever 10 as shown in FIG. 1 for providing user input to the EEC, e.g. The first control lever allows a pilot to provide a single input to control both the engine and the propeller 30 speed. For example, controller 220 may receive a single input from a pilot via first control lever 10, and translate the input into commands for the engine, propeller 30, or both the engine and the propeller. Additionally, the EEC can generate engine and propeller commands while maintaining the engine within engine operating limits so that the pilot does not have to consider these factors when making inputs.

Multiple EECs, each corresponding to an individual engine, can be responsive to pilot input provided to the first control lever 10. More particularly, each EEC can be configured to respond to actuation of a control lever by adjusting an amount of fuel flow to the corresponding engine. Additionally, each EEC may be responsive to input to adjust an amount of fuel flow and propeller speed for a turboprop engine. While the first control lever 10 is configured to provide single lever control of the engine and propeller, a second control lever 14 can be provided for the second engine control subsystem 215. In one example, the second engine control subsystem 215 is a backup hydromechanical engine control subsystem. If the EEC system for one or more gas turbine engines of an aircraft fails, automated dynamic control may be lost for the affected gas turbine engine(s). In such instances, the pilot may use a manually operated backup system to manually control the operation of the affected gas turbine engine(s). For example, the pilot may operate second control lever 14 to control a hydromechanical backup control system to regulate fuel flow to gas turboprop engine 202.

Although FIG. 3 describes an electronic engine control system including one controller 220 for each engine, other arrangements are possible. In some implementations, the aerial vehicle may include a single controller for multiple engines. For example, some gas turbine engines for aircraft may employ automatic engine control systems, such as a Full Authority Digital Engine Control (FADEC) system. For aircraft having two or more gas turbine engines, a FADEC system may be desirable, because the FADEC system dynamically controls the operation of each gas turbine engine and may require minimal, if any, supervision from the pilot. In accordance with some embodiments, the first control lever 10 may control a FADEC system.

Figure 4:
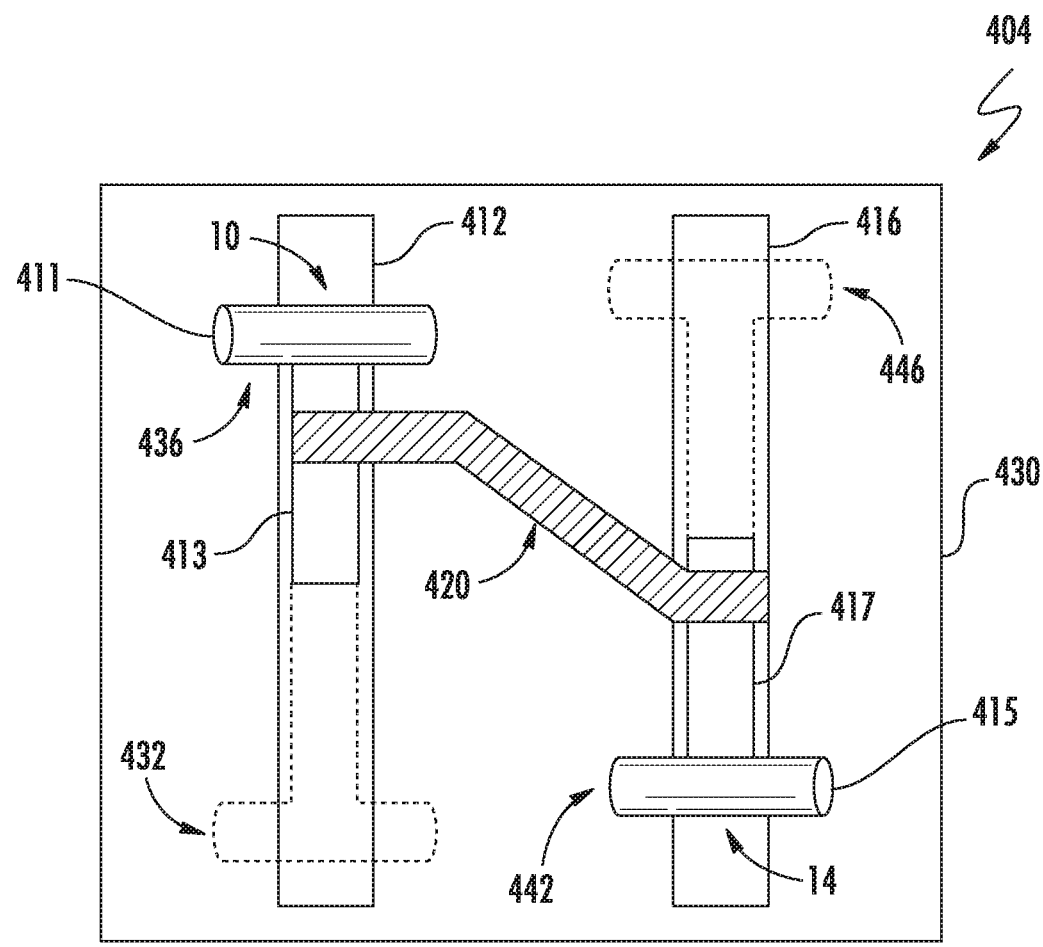
FIG. 4 is a block diagram depicting a top view of engine control system levers in accordance with example embodiments of the disclosed technology.
Figure 4:
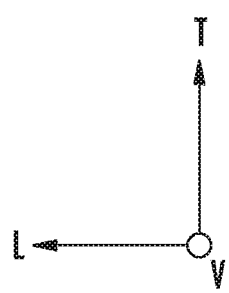
Figure 5:
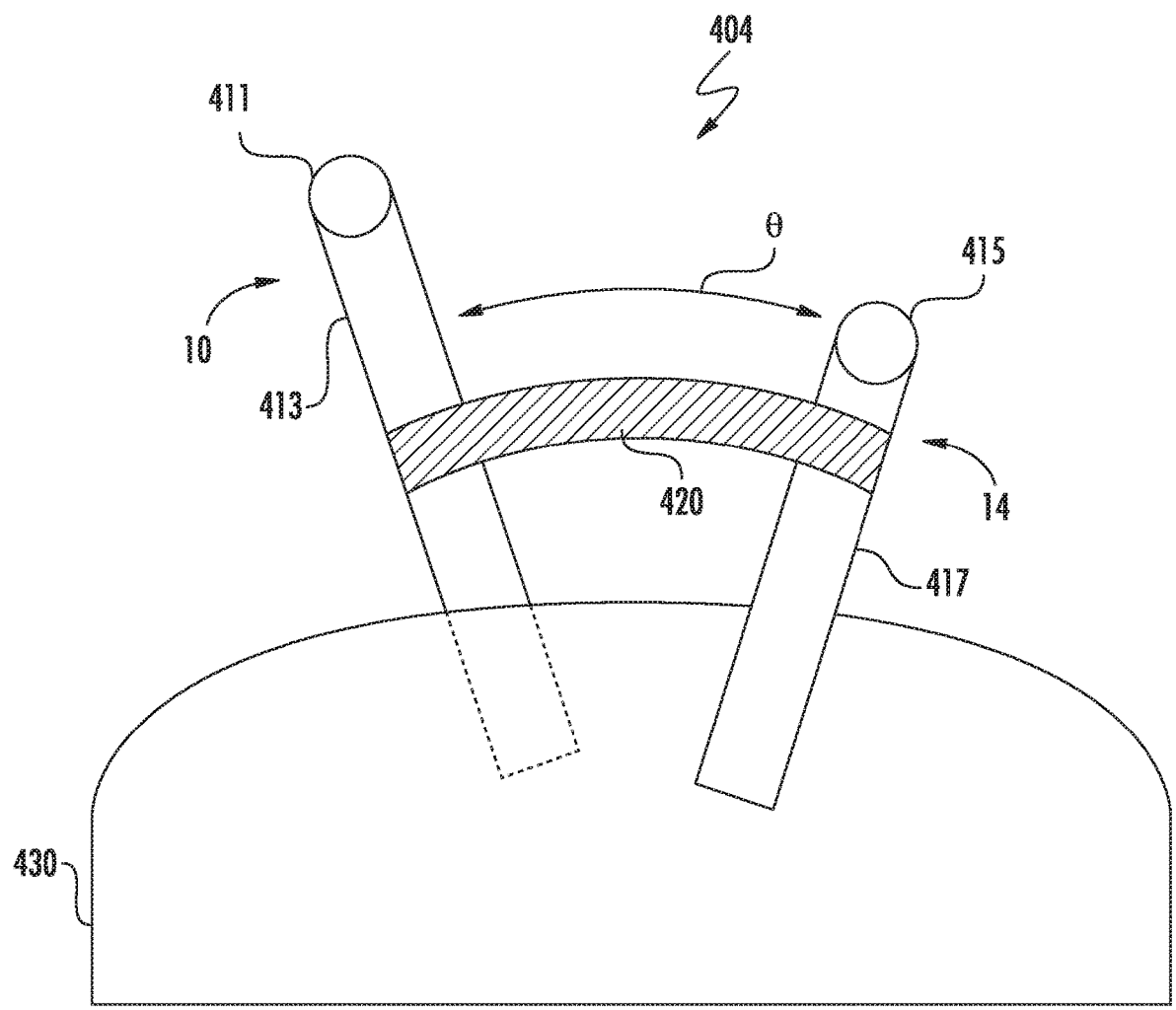
FIG. 5 is a block diagram depicting a side view of the engine control system of FIG. 4 in accordance with example embodiments of the disclosed technology.
Figure 5:
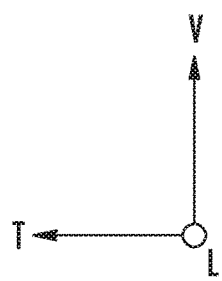

FIG. 4 is a block diagram depicting a top view of an engine control system for an aerial vehicle in accordance with example embodiments of the disclosed technology. FIG. 5 is a side view corresponding to FIG. 4. Engine control system 404 includes a first control lever 10 configured to control a first engine control subsystem and a second control lever 14 configured to control a second engine control subsystem. The first engine control subsystem is a primary fuel flow control subsystem in some examples, and the second engine control subsystem is a backup engine control subsystem such as a secondary or backup fuel flow control subsystem. More particularly, in one example, the first engine control subsystem is a hydromechanical engine control subsystem and the first control lever 10 operates to regulate the fuel flow to the turbine engine. In such examples, the second engine control subsystem can be a backup mechanical or hydromechanical engine control subsystem and the second control lever operates to regulate the fuel flow to the turbine engine using a shut-off valve. In another example, the first control subsystem is an electronic control subsystem and the first control lever operates to send an electronic signal to a controller such as an EEC, ECU, and/or FADEC. In turn, the controller regulates fuel flow to the turbine engine. In such examples, the second control subsystem can be a mechanical or hydromechanical backup subsystem.

The engine control system 404 is depicted within a housing 430 including a first opening 412 and a second opening 416 through which the first control lever 10 and the second control lever 14 protrude vertically in a direction parallel to the vertical axis V as shown in FIG. 4 for reference. The depicted levers are one example of control levers that can be used in accordance with embodiments of the disclosed technology to receive pilot or other operator input for an engine control subsystem. It will be appreciated that levers of any suitable configuration, shape, and orientation may be used. Moreover, the levers may be used to provide physical connection to mechanical, hydraulic, hydromechanical, etc. systems, and/or to provide electrical connection to electronic systems.

Control levers 10, 14 are each configured for rotational movement about an axis formed by coupling of a lower portion 413, 417 of each lever to a corresponding mechanical structure (not shown). With reference to first control lever 10 for example, input applied to the lever causes lateral movement forward and back in a direction parallel to the longitudinal axis T between a first control position 432 and a second control position 436. First control lever 10 includes an upper portion 411 for receiving user input and a lower portion 413 connecting the upper portion to linkage for the first control subsystem. The first control lever 10 translates in the direction parallel to the longitudinal axis T, while not moving substantially in a direction parallel to the lateral axis L. Translation of the lever in the direction parallel to the longitudinal axis T causes resulting movement in a direction parallel to the vertical axis V. By way of example, the distance between an upper portion of first control lever 10 and the surface of housing 430 may be smaller in a direction parallel to the vertical axis V when the lever is at first control position 432 or second control position 436 than when at positions therebetween. In some examples, the first control lever 10 moves in an arc as it translates from its first control position 432 to its second control position 436. The first control position may refer to a position of the lever corresponding to zero or a minimum input level to the corresponding subsystem. For example, first control position 432 may correspond to a zero or minimum fuel flow condition of the control subsystem. The second control position may refer to a maximum input level for the control subsystem, such as a maximum fuel flow condition.

Second control lever 14 may be configured for similar movement to first control lever 10. Second control lever 14 includes an upper portion 415 for receiving pilot input and a lower portion 417 connecting to linkage for the second control subsystem. Second control lever 14 may have the same or different physical dimensions as first control lever 10. Additionally, the start and end positions of second control lever 14 may be the same in the direction of the longitudinal axis T as that of first control lever 10, or they may be different. Similar to first control lever 10, the second control lever 14 includes a third control position 442 that may correspond to a minimum input position of the lever, providing a minimum or zero input level to the corresponding control subsystem. A fourth control position 446 may correspond to a maximum input position of the lever, providing a maximum input level to the corresponding control subsystem.

A mechanical link 420 is provided between the first control lever 10 and the second control lever 14. The mechanical link 420 can be implemented in numerous configurations, but generally provides for movement of the second control lever 14 in a direction parallel to movement of the first control lever 10, responsive to a user applied force to either of the control levers. For example, the mechanical link can provide for movement of second control lever 14 in a direction parallel to the longitudinal axis T in response to movement of first control lever 10 in a direction parallel to the longitudinal axis T. As earlier described, first control lever 10 and second control lever 14 may be configured for rotational movement such that an upper portion 411, 415 of each lever changes position in a direction parallel to the vertical axis V in response to movement in the direction of the longitudinal axis T.

In the example embodiment of FIG. 4, mechanical link 420 includes a fixed connection to first control lever 10 and second control lever 14. Mechanical link 420 comprises a single mechanical member with a fixed connection to first control lever 10 and a fixed connection to second control lever 14. Any suitable connector may be used. For example, the fixed connections may be welded connections or connections made using a fastener such as a bolt or screw. The fixed connections can be configured for attachment to the levers without an ability of a pilot or user to readily alter the connection. The fixed connections may be formed using any suitable component or technique to couple the mechanical link to the lever.

In the example embodiment of FIG. 4, the mechanical link is coupled to a lower portion 413, 417 of each lever. In other embodiments, the mechanical link may be coupled to the lever at any other position.

Although FIGS. 4-5 and much of the disclosure describes a primary control lever for an EEC of an engine and a secondary control lever for a hydromechanical subsystem of the engine, the disclosed technology is not so limited. For example, a mechanical link may be provided between any control levers of an engine control system. A mechanical link between independent control levers may be useful in any system where it may be desirable to position a second control lever based on a position of a first control lever.

According to some embodiments of the disclosed technology, the mechanical link provides an angular offset between the first control lever and the second control lever. FIG. 5 depicts an angular offset θ between the first control lever and the second control lever. More particularly, in example embodiments, the angular offset θ is configured so that for all or a subset of the settings of the first lever, the second lever is in a setting corresponding to a lower power state of the engine than the first lever. For example, the angular offset in FIG. 5 causes the upper end portion of the second control lever 14 to be in a position, along a direction parallel to the longitudinal axis T, that is closer to the starting position of the first lever than a location of the second control lever, relative to its starting location. This remains true for any position of the first control lever in some implementations.

In accordance with example embodiments of the disclosed technology, the angular offset θ provides a safe operating condition for the engine corresponding to a setting of the second control lever, for any possible setting of the first control lever. For instance, the mechanical link can be configured such that for a given setting of the first control lever, the second control lever is placed into a setting that results in lower fuel flow than the first control lever in the given position. Such an arrangement may be useful in ensuring that the engine is not placed into an unsafe operating condition. The angular offset can be selected to ensure that a minimum and maximum acceptable loss of power when transitioning between modes is met. By way of example, the angular offset is selected by characterization of the turbine engine or similar turbine engines in some implementations. The angular offset may be selected so that at a high operating setting of the first control lever, the engine will not undergo a loss of performance that may have adverse consequences on the engine or aircraft. Similarly, the angular offset may also be selected so that at a lower operating settings of the first control lever (e.g., during takeoff), the engine will not undergo a loss of performance that may have adverse consequences on the engine or aircraft if control is shifted to the secondary control subsystem.

In FIGS. 4-5, the angular offset between the first control lever and the second control lever is fixed. For example, the angular offset between the levers is the same when the first control lever is the maximum fuel flow position and the lowest fuel flow position. In other examples, the angular offset between the first control lever and the second control lever can be variable. For example, a kinematics unit can be incorporated within the mechanical link such that the angular offset changes for different positions of the first control lever. More particularly, in some implementations, the angular offset may be smaller at lower power settings and larger at higher power settings. By way of example, a smaller offset at lower power settings may ensure sufficient power during takeoff if the secondary control system is engaged. A larger offset at higher power settings may provide for smoother transitions when the secondary control system is engaged. Other examples may be used as may be suitable to the needs of a particular implementation.

According to some embodiments of the disclosed technology, the mechanical link can be selectively coupled to the first control lever and/or the second control lever. For example, the mechanical link can include a mechanical member and a clutch in one example. The mechanical member can have a fixed connection to the second control lever for the backup control subsystem. The clutch can have a fixed connection to the first lever for the main control subsystem. The mechanical member can be selectively coupled to the clutch, thereby providing a selective connection between the mechanical link and the first lever. For example, the clutch can be configured to receive a portion of the mechanical member. A pin or other fastening mechanism can be used to provide a rigid connection between the clutch and the mechanical member. In this manner, the mechanical link has a first setting whereby the first and second levers are coupled together for movement of both levers in response to input to either lever. Additionally, the mechanical link has a second setting whereby the first and second levers are not coupled together such that the levers may be operated independently. In another example, the clutch can be connected to the second control lever and the mechanical member connected to the first control lever.

Figure 6:
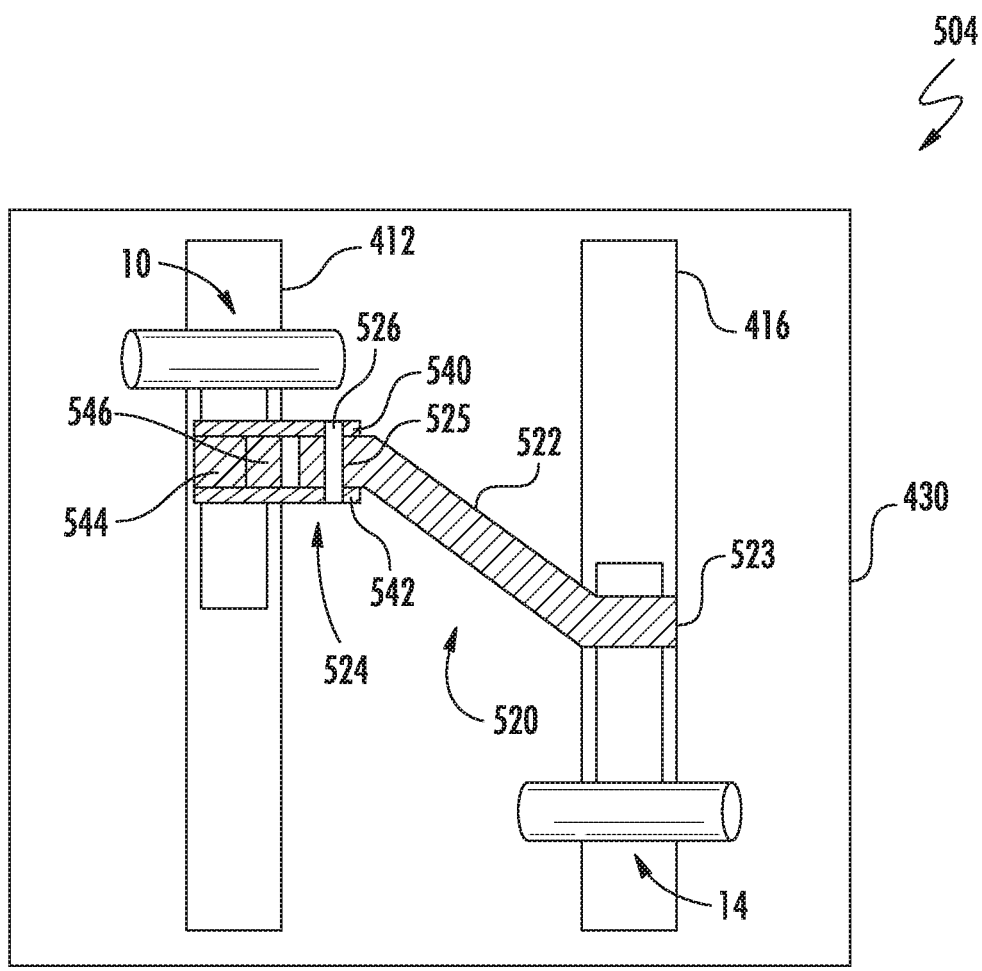
FIG. 6 is a block diagram depicting a top view of an engine control system in accordance with example embodiments of the disclosed technology.
Figure 6:
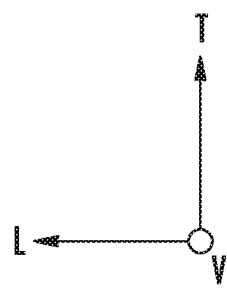
Figure 7:
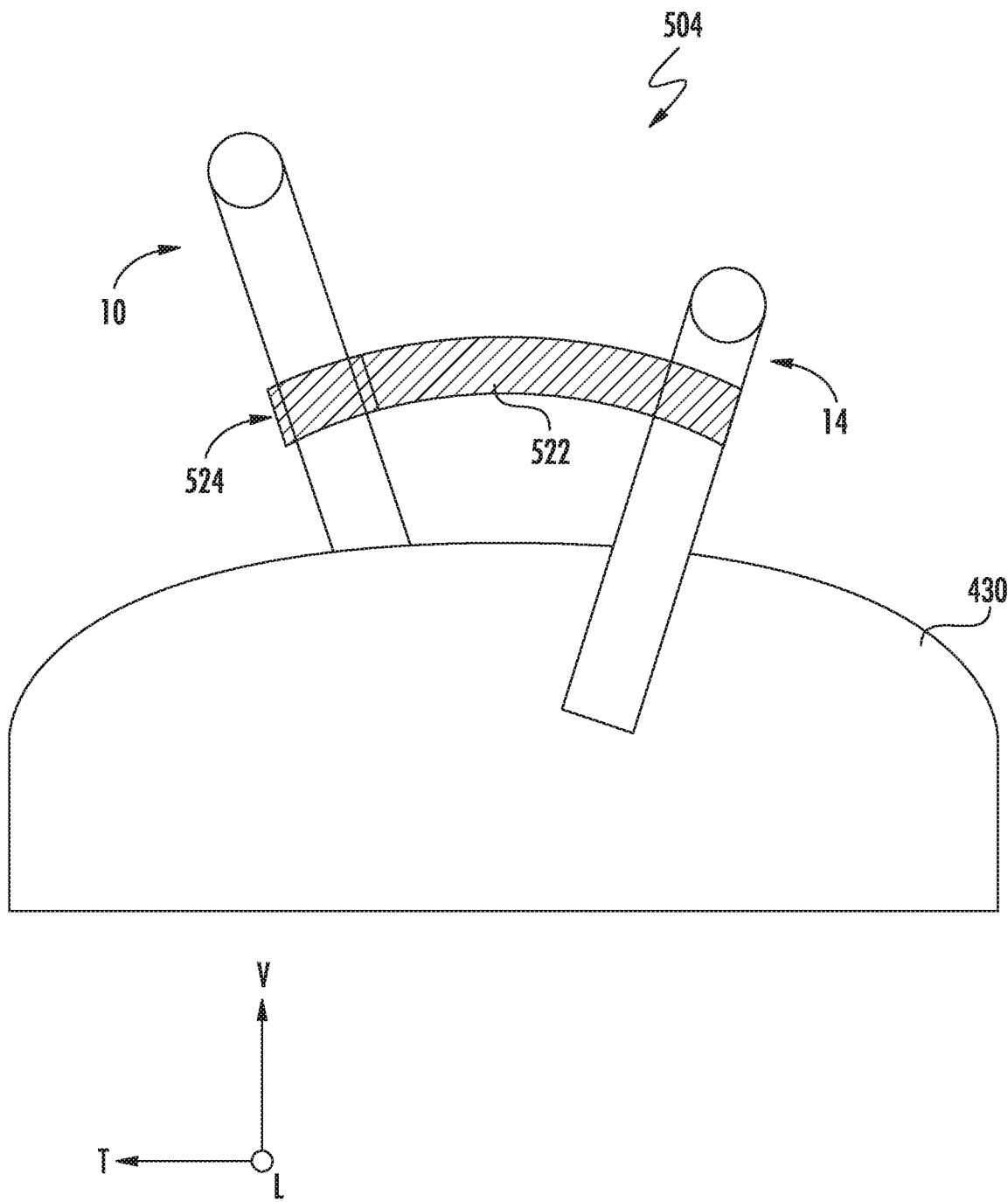
FIG. 7 is a block diagram depicting a side view of the engine control system of FIG. 6 in accordance with example embodiments of the disclosed technology.

FIGS. 6-7 are block diagrams depicting top and side-views of an engine control system 504 according to example embodiments of the disclosed technology. More particularly, control system 504 includes a fixed connection to one control lever and a selective connection to another control lever.

Control system 504 includes control levers 10 and 14 with a mechanical link provided therebetween. Mechanical link 520 includes a mechanical member 522 and a selective coupling mechanism 524. The mechanical member includes a first end 523 that is coupled to second control control lever 14. In FIG. 7, the first end 523 of the mechanical member 522 has a fixed connection (e.g.,weld, screw, bolt, etc.) with the second control lever 14. The mechanical member includes a second end 525 that is selectively coupled to the selective coupling mechanism 524. More particularly, in the disclosed example, the selective coupling mechanism comprises a clutch. The clutch includes a recess formed between support member 540 and support member 542 that extend in directions parallel to the lateral axis L. The two support members 540, 542 extend from a movable central portion 544 of the clutch that is coupled to the first control lever 10. The clutch includes a fixed central portion 546 having a fixed connection to the first control lever 10.

In FIG. 7, the selective coupling mechanism is depicted in a first position where it is coupled to the mechanical member 522. The recess of selective coupling mechanism 524 is configured to receive the second end 525 of the mechanical member 522. The movable central portion 544 is configured to translate in the direction of the lateral axis L between the first position and a second position. In the first position, the clutch is configured for coupling to the mechanical member 522. More particularly, the mechanical member 522 can be placed into the recess. The mechanical member 522 can include a hole or opening that is configured to receive a pin 526. The pin is placed through openings in support members 540, 542 and through the mechanical member 522 to rigidly couple the mechanical member 522 to the clutch.

Figure 8:
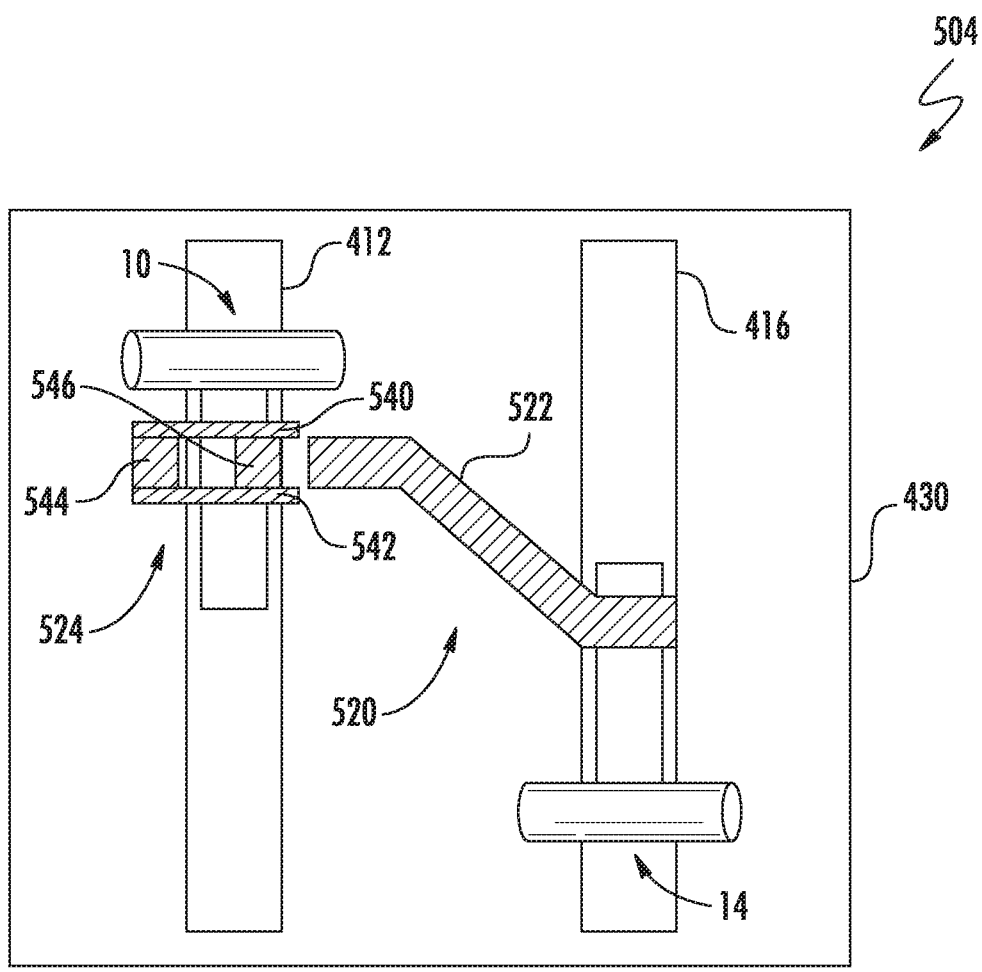
FIG. 8 is a block diagram depicting a top view of the engine control system of FIG. 6 including a mechanical link in a deactivated position in accordance with example embodiments of the disclosed technology.
Figure 8:
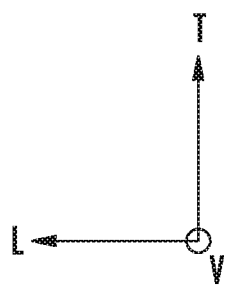

In a second position depicted in FIG. 8, the moveable central portion 544 is translated in an opposite direction parallel to the lateral axis L to decouple the mechanical member 522 from the clutch. More specifically, the pin 526 can be removed and then the moveable central portion 544 moved in the direction as shown. This translates the support members 540, 542 so that mechanical member 522 can be removed from the recess. In the second position of the coupling mechanism, levers 10 and 14 move independently from one another.

It is noted that the selective coupling mechanism depicted in FIGS. 6-8 is provided by way of example and not limitation. Other selective coupling mechanisms may be used. Moreover, the selective coupling mechanism may be coupled to either or both of the control levers.

Although specific features of various embodiments may be shown in some drawings and not in others, this is for convenience only. In accordance with the principles of the present disclosure, any feature of a drawing may be referenced and/or claimed in combination with any feature of any other drawing.

This written description us in es examples to disclose the claimed subject matter, including the best mode, and also to enable any person skilled in the art to practice the claimed subject matter, including making and using any devices or systems and performing any incorporated methods. The patentable scope of the disclosed technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbine engine control system, comprising:
   a first control lever configured for rotational movement between a first control position and a second control position, the first control lever configured for operational control of an engine in a first control mode;
   a second control lever configured for rotational movement between a third control position and a fourth control position, the second control lever configured for operational control of the engine in a second control mode; and
   a mechanical link configured to selectively couple the first control lever to the second control lever with at least one angular offset such that for at least a subset of control positions of the first control lever, a distance between the first control lever and the first control position is greater than a distance between the second control lever and the third control position.

2. The turbine engine control system of claim 1, wherein the at least one angular offset is a constant predetermined angular offset between the first control lever and the second control lever for a plurality of control positions of the first control lever.

3. The turbine engine control system of claim 1, wherein:
   the first position of the first control lever corresponds to a lower power setting than the second position of the first control lever;
   the at least one angular offset includes a first angular offset at the first position of the first control lever and a second angular offset at the second position of the first control lever; and
   the second angular offset is greater than the first angular offset.

4. The turbine engine control system of claim 1, wherein the at least one angular offset is between a user input portion of the first control lever and a user input portion of the second control lever.

5. The turbine engine control system of claim 1, wherein the at least one angular offset causes a smaller actuation of the second control lever relative to the first control lever.

6. The turbine engine control system of claim 1, wherein:
the mechanical link is configured to selectively couple the first control lever to the second control lever based on user input.

7. The turbine engine control system of claim 6, wherein the mechanical link includes:
a mechanical member coupled to the second control lever; and
a clutch mechanism coupled to the first control lever and selectively coupleable to the mechanical member.

8. The turbine engine control system of claim 7, further comprising:
an electronic engine controller coupled to the first control lever;
wherein the first control mode is an electronic engine control mode; and
wherein the second control mode is a hydromechanical engine control mode.

9. An aerial vehicle, comprising:
one or more turbine engines;
a first engine control subsystem for the one or more turbine engines;
a second engine control subsystem for the one or more turbine engines;
a first control lever having a first position corresponding to a minimum power setting of the first engine control subsystem and a second position corresponding to a maximum power setting of the first engine control subsystem;
a second control lever having a third position corresponding to a minimum power setting of the second engine control subsystem and a fourth position corresponding to a maximum power setting of the second engine control subsystem; and
a mechanical link configured to selectively couple to the first control lever and the second control lever, the mechanical link providing an offset between the first control lever and the second control lever such that for at least a subset of control positions of the first control lever, a resulting power setting of the second engine control subsystem is less than a resulting power setting of the first engine control subsystem.

10. The aerial vehicle of claim 9, wherein:
the offset is an angular offset between the first control lever and the second control lever; and
the angular offset is constant for the subset of control positions of the first control lever.

11. The aerial vehicle of claim 9, wherein:
the offset is an angular offset between the first control lever and the second control lever; and
the angular offset is variable for the subset of control positions of the first control lever.

12. The aerial vehicle of claim 9, wherein:
the first control lever is configured for rotational movement between the first position and the second position; and
the second control lever is configured for rotational movement between the third position and the fourth position.

13. The aerial vehicle of claim 9, wherein the mechanical link includes:
a mechanical member coupled to the second control lever; and
a selective coupling device coupled to the first control lever and selectively coupleable to the mechanical member.

14. The aerial vehicle of claim 9, wherein:
the first engine control subsystem is an electronic engine control subsystem configured to regulate fuel flow to the one or more turbine engines based at least in part on a position of the first control lever;
the second engine control subsystem is a hydromechanical control subsystem configured to regulate fuel flow to the one or more turbine engines based at least in part on a position of the second control lever.

15. An engine control system, comprising:
a first control lever coupled to an electronic engine control subsystem for one or more turbine engines, the electronic engine control subsystem configured to regulate fuel flow to the one or more turbine engines;
a second control lever coupled to a backup engine control subsystem for the one or more turbine engines, the backup engine control subsystem configured to regulate fuel flow to the one or more turbine engines in the event of a failure of the electronic engine control subsystem; and
a coupling device configured to selectively couple the first control lever to the second control lever with at least one angular offset, the coupling device including a support member having a fixed connection to the second control lever, the coupling device including a selective coupling mechanism having a fixed connection to the first control lever and a selective connection to the support member.

16. The engine control system of claim 15, wherein:
the at least one angular offset is a constant predetermined angular offset between the first control lever and the second control lever for a plurality of control positions of the first control lever.

17. The engine control system of claim 15, wherein:
the first control lever includes a first control position corresponding to a first power setting of the at least one turbine engine;
the second control lever includes a second control position corresponding to a second power setting of the at least one turbine engine, the second power setting is less than the first power setting; and
the at least one angular offset forces the second control lever to the second control position when the first control lever is in the first control position.

18. The engine control system of claim 15, wherein:
the first control lever is configured for rotational movement between a first control position corresponding to a minimum power setting of the one or more turbine engines and a second position corresponding to a maximum power setting of the one or more turbine engines; and
the second control lever is configured for rotational movement between a third position corresponding to the minimum power setting and a fourth position corresponding to the maximum power setting.

19. The engine control system of claim 15, wherein:
the selective coupling mechanism is a clutch.

\* \* \* \* \*